Dec. 8, 1931.  W. L. LEWIS ET AL  1,835,312
AIRPLANE WING COVERING
Filed July 6, 1929
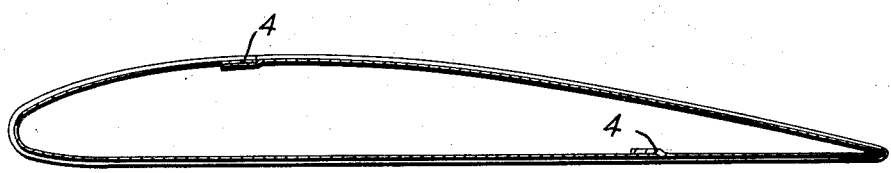
FIG.1
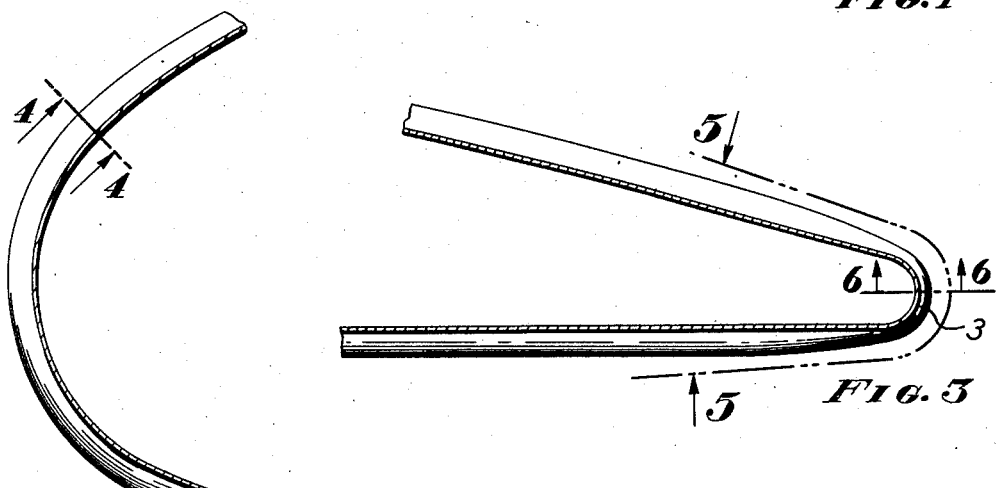
FIG.2
FIG.3
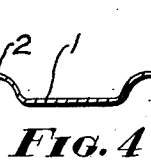
FIG.4
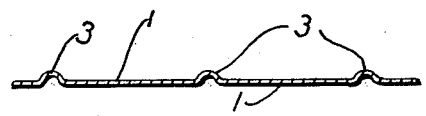
FIG.6
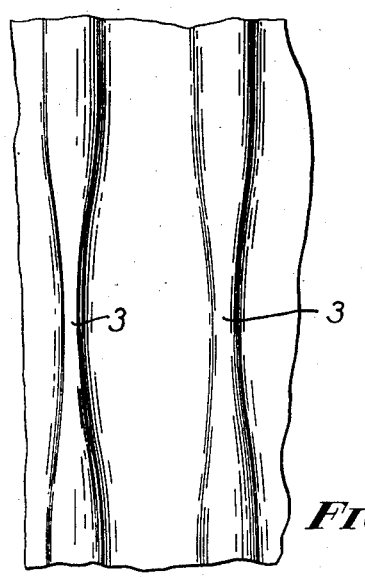
FIG.5
INVENTOR.
WILLIAM L. LEWIS
FREDERICK H. ROHR
BY
A.B.Bowman
ATTORNEY Patented Dec. 8, 1931

1,835,312

UNITED STATES PATENT OFFICE

WILLIAM L. LEWIS AND FREDERICK H. ROHR, OF SAN DIEGO, CALIFORNIA, ASSIGNORS TO SOLAR AIRCRAFT COMPANY, OF SAN DIEGO, CALIFORNIA, A CORPORATION OF DELAWARE

AIRPLANE WING COVERING

Application filed July 6, 1929. Serial No. 376,332.

Our invention relates to airplane wing coverings, more particularly to metallic wing covering, and the objects of our invention are: First, to provide a wing covering of this class which combines the advantages of a smooth surfaced and corrugated surfaced wing covering; second, to provide a wing covering which for a given amount of material covers a greater wing surface than it is possible to do with corrugated wing covering, yet does not appreciably sacrifice strength; third, to provide a wing covering which because of the greater surface covered per sheet area reduces the cost as well as the weight of the wing; fourth, to provide a wing covering having flat surfaces so that rivets may readily secure the covering to the ribs and other portions of a wing without marring or injuring the wing covering by the corners of the rivet head cutting in, and also insuring a perfectly sealed joint through which moisture or the like cannot seep; fifth, to provide a wing covering which may be carried without buckling over corners having relatively small radii; sixth, to provide a wing covering in which the material is carried over the leading and trailing edges of the wing without joints at these places; seventh, to provide an airplane wing covering having ridges which are reduced at places so as to enable the material to pass around a relatively sharp corner without buckling; and eighth, to provide an airplane wing covering which is easily manufactured, easy to apply over the wing, durable, and which will not readily deteriorate or get out of order.

With these and other objects in view is will appear hereinafter, our invention consists of certain novel features of construction, combination, and arrangement of parts and portions as will be hereinafter described in detail and particularly set forth in the appended claims, reference being had to the accompanying drawings and to the characters of reference thereon which form a part of this application, in which:

Figure 1 is a typical transverse sectional view through an airplane wing, with the spars, ribs, and other internal structure removed; Fig. 2 is an enlarged end fragmentary sectional view of our airplane wing covering, taken transversely with the wing and showing the curvature of the wing covering over the leading edge; Fig. 3 is a similar fragmentary sectional view of the trailing edge; Fig. 4 is a fragmentary sectional view longitudinal with the wing taken through 4—4 of Fig. 2 and showing an adjacent portion of a rib in connection therewith; Fig. 5 is a fragmentary developed view of the trailing edge portion taken along 5—5 of Fig. 3, and Fig. 6 is a sectional view through 6—6 of Fig. 3 taken longitudinally with the wing.

Similar characters of reference refer to similar parts and portions throughout the several views and drawings.

As shown in the several views, our wing covering consists of a plurality of flat band portions 1 extending transversely with the wing and placed apart one from the other by ridges 2 formed integral. The convex surface of the ridges extend towards the outer surface of the wing. The flat band portions 1 have a substantially greater width than the ridges as shown in Figs. 4 and 5, so that the greater portion of the covering is flat surface, thereby greatly reducing the lost ineffective covering due to the metal taken up in the curved or ridge portions.

The heights of the ridge portions 2 are made relatively small so that when the metal is curved as shown in Fig. 2 in order to form the leading edge of the wing, the material along the top of the ridges does not have to stretch far enough to distort the covering.

As shown in Fig. 4, the covering is secured to the ribs of the wing by the flat band portions 1. This enables the rim of the rib to lie flat against the covering and form a firm support therefor; it also permits the rivets to form a tight strong joint between the rib and covering which is difficult to do where the surface of the wing is curving relative to the rib.

When it is desired to make very sharp corners as shown in Fig. 3, the ridges are reduced in size as indicated by 3, thereby making the band portions slightly wider. The smaller ridge portions 3 gradually merge into the larger ridge portions 2 as indicated in Figs. 3 and 5, thus giving a finished effect to the wing. By making the ridges small enough in comparison to the flat band portion so as to enable the ridges to be carried over the leading and trailing edges of a wing, the joining of the various sheets of covering is facilitated, as the joints may be made along a relatively flat portion of the wing and located any desired distance from the leading or trailing edges thereof, as indicated by 4 in Fig. 1.

It is obvious from the construction as illustrated in the drawings and described in the foregoing specification that there is provided a wing covering as aimed at and set forth in the objects of the invention, and though we have shown and described the particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. A wing covering comprising substantially flat band portions separated by ridge portions integral therewith, said ridge portions being reduced in size over a portion of said covering to facilitate the curving of said wing covering about a small radius in order to form the trailing edge of a wing, the sizes of said ridge portions relative to said flat portions being such that the conventional leading edge of a wing may be formed with the covering without reducing the size of said ridges.

2. In an airplane wing covering, a sheet comprising laterally extending flat portions interspersed by corrugated portions, said sheet being bent to form the entering edge of a wing, a small portion of the upper surface thereof and a major portion of the lower surface, said corrugations extending in substantially undiminished size around said leading edge, and a second sheet having flat portions and interspersed corrugated portions, said corrugations being attenuated in substantially hour glass form over a narrow band portion of said second sheet toward the one end thereof, said second sheet being bent in V form around a relatively small radius at said narrow band portion to form the trailing edge of said wing, the greater arm of said V joining the upper edge and the lesser arm joining the lower edge of said first sheet and completing the wing surfaces.

3. In a wing covering including a portion forming the trailing edge of a wing, a metal sheet having interspersed flat and ridged portions of a substantially constant width over the greater portion of said sheet and forming a substantial portion of the wing surface, said sheet having narrow band portions over which said ridged portions are attenuated in hour glass form for allowing said sheet to be bent around a small radius to form the trailing edge of a wing without unduly stressing the metal.

4. In a wing covering, substantially transversely straight band portions of substantially constant width, separated by ridge portions integral therewith, said ridge portions reduced in size over a portion of said covering to facilitate the curving of said wing covering about a small radius, forming the trailing edge of the wing.

5. In a wing covering, substantially transversely straight band portions of substantially constant width, separated by ridge portions integral therewith, said transversely straight band and ridge portions carried over both the leading and trailing edges of a wing without joints at such places.

In testimony whereof, we have hereunto set our hands at San Diego, California, this 19th day of June, 1929.

WILLIAM L. LEWIS.
FREDERICK H. ROHR.